Patented Feb. 7, 1950

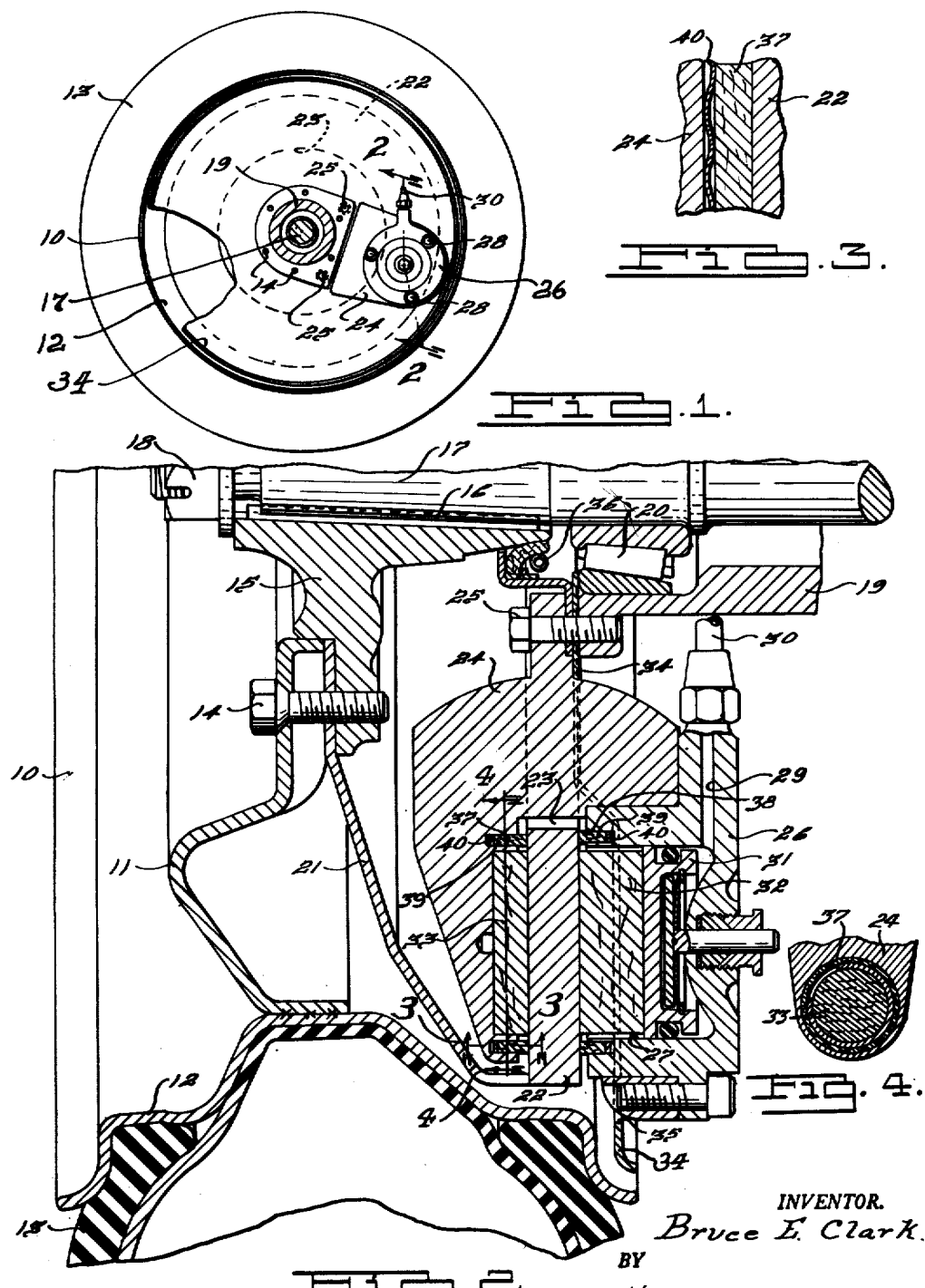

2,496,699

UNITED STATES PATENT OFFICE 2,496,699

WIPER FOR LIMITED CONTACT DISK BRAKES

Bruce E. Clark, Detroit, Mich., assignor to Chrysler Corporation, Highland Park, Mich., a corporation of Delaware Application August 29, 1946, Serial No. 693,641

10 Claims. (Cl. 188—72)

This invention relates to vehicle brakes and more particularly to a means for maintaining the friction surface of a disc brake clean and eliminating road dirt and moisture from the disc braking area.

Limited contact disc brakes are known and commonly provide a disc portion operatively secured to the vehicle wheel or rotatable axle in combination with a non-rotatable portion. The disc is usually disposed in substantially parallel relationship to the wheel. The non-rotatable portion is provided with means to force a friction element carried by the non-rotatable portion to contact the side of the disc under pressure. Usually the element referred to presents a small braking surface relative to the disc area and when the wheel and disc rotate and the brake is applied the friction element is forced into contact with the disc. The disc braking surface rotates past the friction element with only a minor portion in engagement therewith at any one time while the major portion of the rotating disc is exposed to the air and being cooled.

One difficulty with this type of brake has been found to be that the portion of the disc which is exposed to the air is also exposed to dust, water, mud, slush, and similar road dirt. The presence of this road dirt on the disc is detrimental when the dirt comes into contact with the friction element. Water and dirt radically change the coefficient of friction of the element on the disc and wear of the parts is accelerated. I have provided means to remedy this defect by preventing the road dirt from coming in contact with the friction disc. I provide a means for cleaning a localized area of the disc and always presenting a clean disc surface in alignment with the friction element. In addition, I seal the movable member itself from direct contact with the road dirt.

The device to be described herein is also illustrated in my copending applications Serial Nos. 693,639 and 693,640.

In the drawings:

Fig. 1 is an elevation of a vehicle wheel viewing its internal surface and showing a disc brake associated therewith;

Fig. 2 is a section taken on the line 2—2 of Fig. 1;

Fig. 3 is a section taken on the line 3—3 of Fig. 2; and

Fig. 4 is a section taken on the line 4—4 of Fig. 2.

The vehicle wheel 10 comprises a disc portion 11, a rim 12, and tire 13. The wheel is secured by screws 14 to the hub 15 in the usual manner.

The tapered hub 15 is keyed at 16 in the usual tapered rotatable axle 17 and secured thereto against linear movement relative to the axis of the axle by the nut 18. The axle housing 19 rotatably supports axle 17 by bearings 20. The brake is illustrated and described with reference to an automobile driving wheel although it is to be understood that it could be used with other vehicles and with driven wheels.

The brake to be described is composed of two portions. One of these portions is secured to and rotates with the wheel 10 and axle 17. This portion comprises a dished supporting member 21 which is secured to the hub 15 by screws 14 and carries at its outer extremity a disc 22. The disc 22 has a central opening 23 which gives it a ring shape. The disc 22 is disposed substantially normal to the axle 17 and rotates therewith through the key 16, hub 15, screws 14, and supporting member 21. The second portion of the disc brake is the stationary portion which is mounted upon the axle housing 19 and comprises a brake housing 24 which is secured to the axle housing by the screws 25. The brake housing 24, because it is secured to the axle housing 19, is stationary. It is provided with a substantially U-shaped cross section which straddles the rotatable disc 22 and has portions disposed adjacent both the outer and the inner surfaces of the disc 22. The brake housing 24 supports a hydraulic braking means adapted to contact the disc 22 and resist rotation of the latter by friction. This means comprises a member 26 which has a cylinder 27 formed therein on an axis parallel to the axle 17. The member 26 is secured to the brake housing 24 by screws 28. The cylinder 27 is connected to a suitable source of supply of fluid by passage 29 in member 26 and conduit 30. Braking fluid may be supplied to the cylinder 27 under pressure in the usual manner employed by hydraulic braking systems. A piston 31 is slidably mounted in cylinder 27 for axial movement in the cylinder 27 when fluid is supplied under pressure to one side of the piston. A pad of fibrous friction material 32 is bonded to one face of the piston 31 and is positioned in close proximity to the rotatable disc 22. A similar pad of fibrous friction material 33 is bonded to brake housing 24 adjacent the disc 22 immediately opposite the pad 32. It will thus be seen that the entrance of fluid through conduit 30 will exert a force on piston 31 moving it to the left as viewed in Fig. 2 thereby squeezing the ring 22 between the pads of friction material 32 and 33. The rotation of the disc 22 is resisted by the friction of these pads on its surfaces and the force resisting this rotation reacts through pad 32 and through the brake housing 24 to the stationary axle housing 19.

A dust shield 34 is illustrated as secured to the axle housing 19 by the screws 25 and extending substantially parallel to the wheel 10. The dust shield is circular in form and has an opening 35 provided therein through which the brake housing 24 extends. The dust shield may be used to prevent the entrance of some road dust into the area between the shield and the wheel. The dust shield may be omitted if a better circulation of cooling air around the disc 22 is desired.

Oil for the axle housing 20 is sealed in the area adjacent the bearing 20 by the usual oil seal 36.

I have provided novel means to assure the presence of clean disc surfaces in alignment with the friction pads 32 and 33 at all times. I have provided a circular channel 37 in the brake housing 24. The channel 37 surrounds the pad 33. I have provided a similar channel 38 in the member 26 surrounding the pad 32. A circular non-metallic absorbent wiper 39 such as a commercial plumbers' asbestos rope packing is provided in each of the channels 37 and 38. A spring washer 40 is provided in the base of each channel so that the adsorbent wipers are resiliently urged into constant contact with the rotatable disc 22. It will thus be seen that no surface portion of the disc 22 can contact the friction pads 32 or 33 unless it has first been subjected to the cleansing action of the wipers. By the use of these wipers the successive portions of the surface in contact with the pads are always substantially free of road dirt and the coefficient of friction between the pads 32 and 33 and the disc 22 is substantially constant. In addition the wipers cooperate with the disc 22 and housing 24 to enclose the pads and prevent the direct entrance of dirt to the pads 32 or 33. The wipers may, if desired, be provided with other shapes than the circular shape and could be provided so that they only partially surround the pads 32 and 33. It would be necessary to position them "ahead of" the pads relative to the rotating disc under these conditions.

I claim:

1. A combination comprising an element rotatable about an axis and a non-rotatable element, a disc member carried by one of said elements in a plane normal to said axis, a friction member carried by the other of said elements and adapted to contact a relatively small area on said disc, means to selectively engage and disengage said friction member with said disc to brake said rotatable element and a wiper encircling the area of contact of said friction member with said disc to clean successive portions of said disc prior to their contact with said friction member.

2. In a vehicle the combination of an element rotatable about a first axis and a non-rotatable element, a disc carried by said rotatable element and having its axis coinciding with said first axis, a housing carried by said non-rotatable element, a friction pad carried by said housing parallel to said disc, means to force said pad into frictional engagement with said disc to brake said disc and said rotatable element, and a non-metallic absorbed wiper encircling said pad and carried by said housing in wiping relationship with said disc to clean the portion of said disc adjacent said pad.

3. In a vehicle with an unsprung portion the combination with an unsprung portion of an element rotatable about a first axis and a non-rotatable element, a disc carried by said rotatable element and having its axis coinciding with said first axis, a housing carried by said non-rotatable element, a friction pad carried by said housing parallel to said disc, means to force said pad into frictional engagement with said disc to brake said disc and said rotatable element, and a ring of absorbent material surrounding said pad and supported by said housing in sliding contact with said disc to clean successive portions of said rotatable disc as an incident to their presentation to said pad for frictional engagement therewith.

4. In a vehicle the combination of an element rotatable about a first axis and a non-rotatable element, a disc carried by said rotatable element and having its axis coinciding with said first axis, a housing carried by said non-rotatable element, a friction pad carried by said housing parallel to said disc, said pad having a relatively small area compared to said disc, means to move said pad parallel to said axis to frictionally engage said disc, a ring of resilient material encircling said pad and spring means urging said ring into constant wiping relationship with said disc, so that successive portions of said disc are wiped clean by the disc rotation past said ring immediately prior to their alignment with said pad.

5. In a vehicle the combination of an element rotatable about a first axis and a non-rotatable element, a disc carried by said rotatable element and having its axis coinciding with said first axis and so exposed to atmosphere as to be cooled thereby, a housing carried by said non-rotatable element, a friction pad carried by said housing parallel to said disc, said pad having a relatively small area compared to said disc, means to move said pad parallel to said axis to frictionlly engage said disc, a resilient element supported by said housing independently of said pad and positioned in constant wiping relationship with said disc, said element being located adjacent said pad and having at least a portion thereof so disposed that successive portions of said disc are wiped clean by the disc rotation past said element immediately prior to their alignment with said pad.

6. In a vehicle the combination of an element rotatable about a first axis and a non-rotatable element, a disc carried by said rotatable element and having its axis coinciding with said first axis, a friction pad carried by said non-rotatable element parallel to said disc, said pad having a relatively small area compared to said disc, means to move said pad parallel to said axis to frictionally engage said disc, a wiper element, means constantly urging said element into wiping relationship with said disc at a predetermined pressure, said element being located adjacent said pad and having a first portion thereof so disposed that successive portions of said disc are wiped clean by the disc rotation past said element immediately prior to their alignment with said pad and said element having a second portion protecting said pad from foreign matter moved radially on said disc by centrifugal force.

7. In a vehicle the combination of an element rotatable about a first axis and a non-rotatable element, a disc carried by said rotatable element and having its axis coinciding with said first axis, a friction pad carried by said non-rotatable element parallel to said disc, said pad having a relatively small area compared to said disc, means to move said pad parallel to said axis to frictionally engage said disc, an absorbent wiper element supported by said non-rotatable element, resilient means to urge said element into wiping relationship with said disc, said element encircling said pad so that successive portions of said disc are wiped clean by the disc rotation past said element immediately prior to their alignment with said pad and so that foreign matter moving radially of said disc is intercepted by said element prior to the contacting of said pad by said matter.

8. In a vehicle the combination of an element rotatable about a first axis and a non-rotatable element, a disc carried by said rotatable element and having its axis coinciding with said first axis and so exposed to atmosphere as to be cooled thereby, a housing carried by said non-rotatable element, a friction pad carried by said housing parallel to said disc, said pad having a relatively small area compared to said disc, means to move said pad parallel to said axis to frictionally engage said disc, said housing having an annular channel encircling said pad, a ring of wiper material retained in said channel, a spring positioned in said channel below said ring and operable to urge said ring into constant contact with said disc so that successive portions of said disc are wiped clean by the disc rotation past said ring immediately prior to their alignment with said pad.

9. In a vehicle the combination of an element rotatable about a first axis and a non-rotatable element, a disc carried by said rotatable element and having its axis coinciding with said first axis, a housing carried by said non-rotatable element, a friction pad carried by said housing parallel to said disc, means to force said pad into frictional engagement with said disc to brake said disc and said rotatable element, means surrounding said pad and constantly engaging both said disc and said housing with a predetermined pressure to cooperate with said disc and housing to enclose said pad and substantially seal it from contact with road dirt.

10. In a vehicle the combination of an element rotatable about a first axis and a non-rotatable element, a disc carried by said rotatable element and having its axis coinciding with said first axis, a housing carried by said non-rotatable element, a pair of aligned friction pads carried by said housing parallel to and in close proximity to said disc, one of said pads being disposed on each side of said disc, means to move one of said pads into engagement with said disc under pressure, whereby said disc is forced into engagement with said other pad and the friction of said pads on said disc brakes said disc, and two rings of absorbent material, each of said rings surrounding one of said pads and being supported by said housing in sliding contact with said disc to clean successive portions of said rotatable disc as an incident to their presentation to said pads for frictional engagement therewith.

BRUCE E. CLARK.

REFERENCES CITED

The following references are of record in the file of this patent:

UNITED STATES PATENTS

| Number | Name | Date |
|---|---|---|
| 2,351,041 | Hawley | June 13, 1944 |
| 2,373,572 | Lambert | Apr. 10, 1945 |